UNITED STATES PATENT OFFICE.

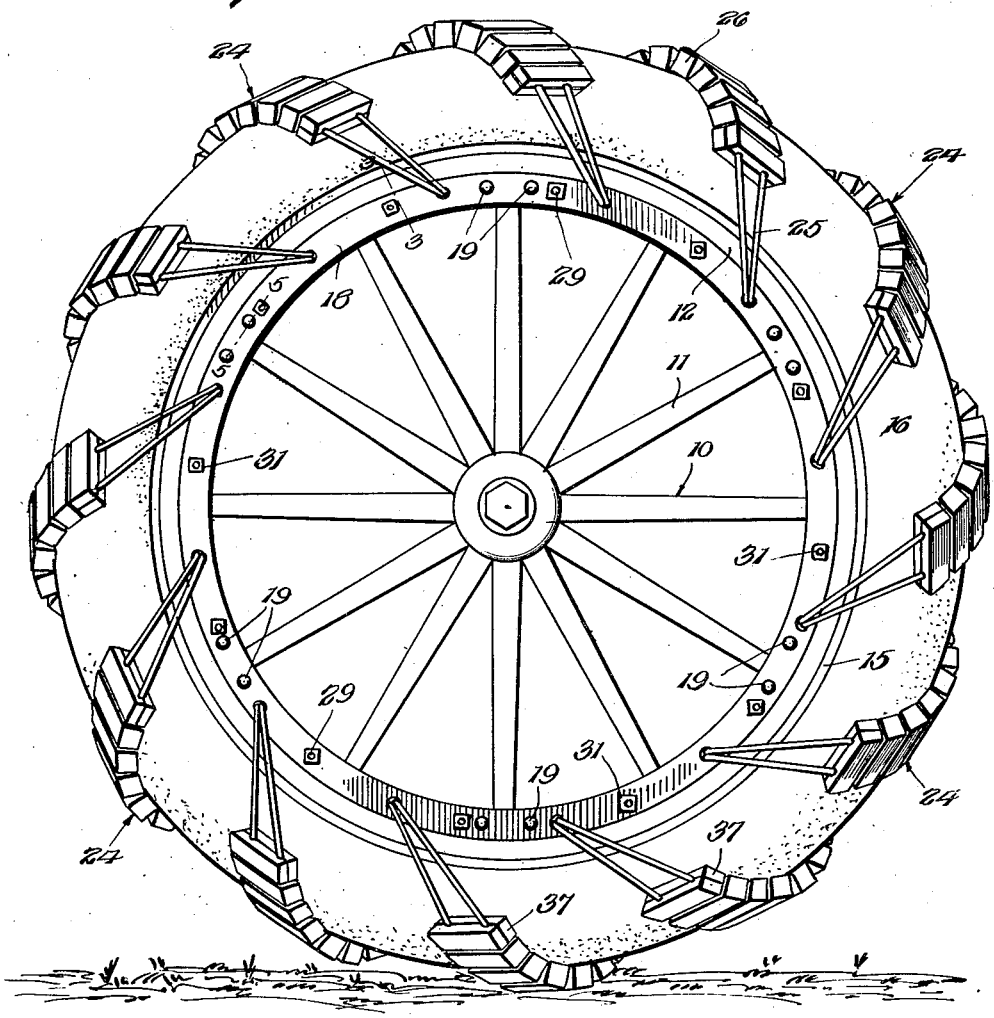

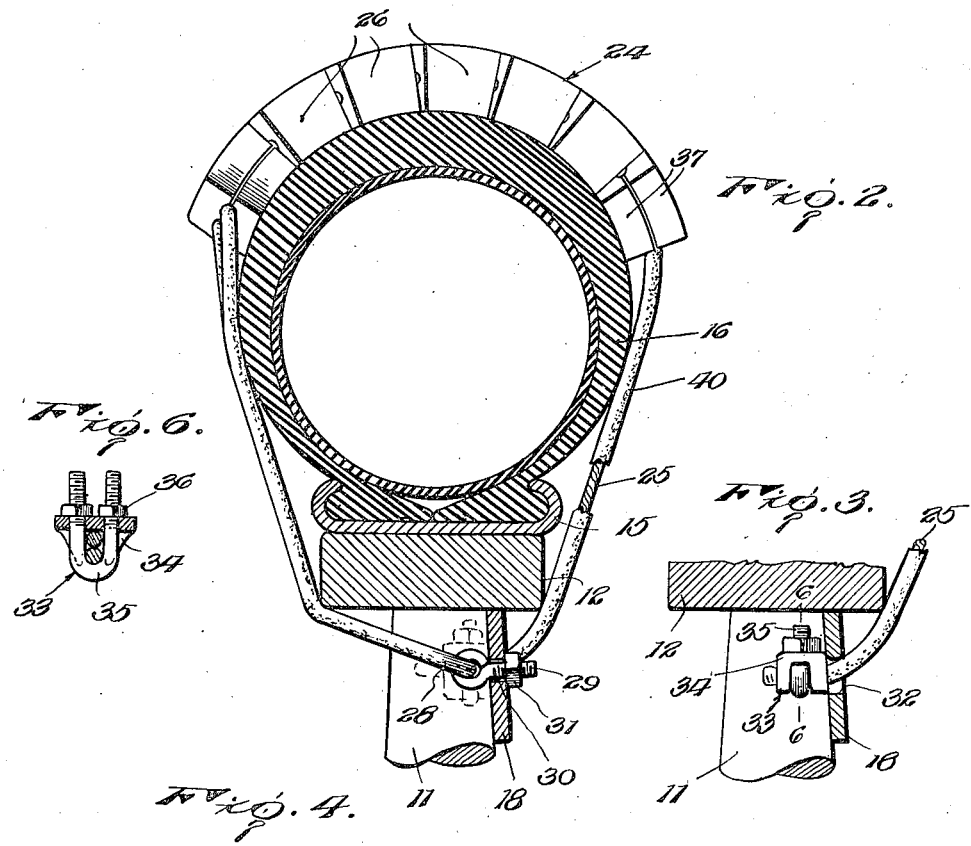
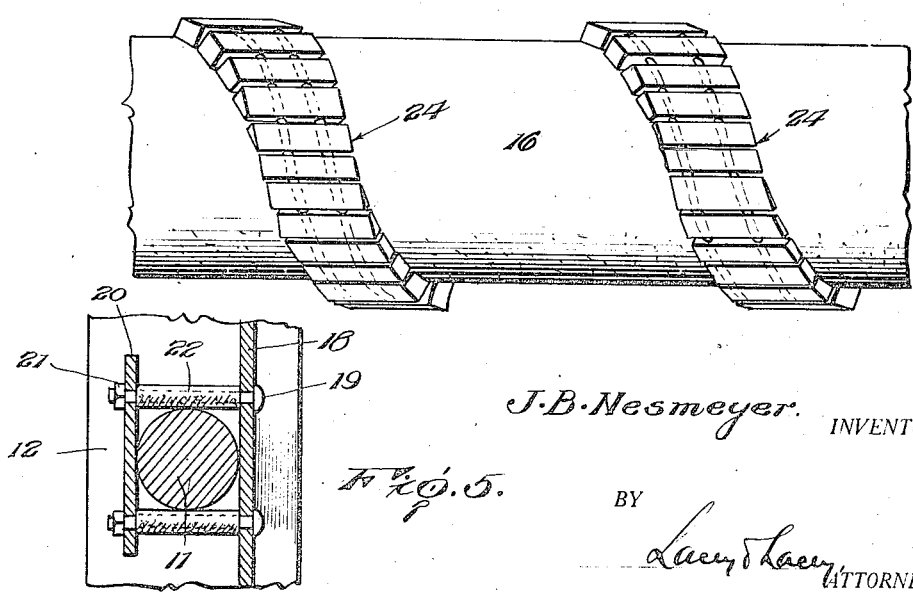

JOHN BERNARD NESMEYER, OF OMAHA, NEBRASKA.

NON-SKID DEVICE.

1,369,122.   Specification of Letters Patent.   Patented Feb. 22, 1921.

Application filed April 8, 1920. Serial No. 372,202.

*To all whom it may concern:*

Be it known that I, JOHN B. NESMEYER, a citizen of the United States, residing at Omaha, in the county of Douglas and State of Nebraska, have invented certain new and useful Improvements in Non-Skid Devices, of which the following is a specification.

This invention relates to improvements in anti-skid devices especially adapted for use on vehicle wheels.

An important object of this invention is to provide a non-skid attachment for vehicle wheels which may be readily and conveniently applied to a vehicle wheel for increasing the traction of the same as the occasion requires.

A further object of this invention is to provide a non-skid attachment for vehicle wheels which comprises a plurality of rows of oblong tread blocks detachably strung on or carried by a flexible element in the form of a cable and capable of being replaced when worn as the result of continued use.

The invention further aims to provide a non-skid attachment having a plurality of spaced tread elements adapted to be extended diagonally across the tread of a vehicle tire so that as the tire rotates each of the several tread elements will be gradually engaged with the ground whereby the objectionable shocks transmitted to the power plant of the vehicle as the result of sudden engagement with the tread elements with the ground are eliminated.

A further object of this invention is to provide a non-skid attachment for vehicle wheels which is simple, efficient in use and cheap to manufacture.

Other objects and advantages of the invention will be apparent during the course of the following description.

In the accompanying drawings forming a part of this application and in which like numerals are employed to designate like parts throughout the same, Figure 1 is a side elevation of a vehicle wheel having the improved non-skid attachment applied, Fig. 2 is a detail transverse section through the wheel and the tire, the view illustrating the application of the device, Fig. 3 is a detail section taken on line 3—3 of Fig. 1, Fig. 4 is a fragmentary edge elevation of the vehicle wheel, the view illustrating the application of the attachment, Fig. 5 is a detail section taken on line 5—5 of Fig. 1, Fig. 6 is a detail section taken on line 6—6 of Fig. 3, Fig. 7 is a vertical sectional view through one of the tread blocks.

In the drawings wherein for the purpose of illustration is shown a preferred embodiment of the invention, the numeral 10 generally designates a vehicle wheel having a plurality of radial spokes 11 which have a felly 12 connected thereto. A rim 15 of any desired type may be arranged about the felly 12 for detachably securing the tire 16 about the wheel. The improved non-skid chain forming the subject matter of this application embodies an attaching ring 18 arranged at one side of the spokes and secured to the same by pairs of bolts 19. With particular reference to Fig. 5, it will be noted that the bolts of each pair are arranged on opposite sides of the adjacent spoke and extend through elongated plates 20 arranged on opposite sides of the spoke and drawn tightly into engagement with the same by fastening nuts 21. The bolts 19 are spaced from contact with the spokes by tubular cushioning elements 22 carried by the bolts between the ring 18 and the plates 20. The spokes are therefore prevented from being scratched or marred through contact with the bolts 19.

The ring 18 serves as a connecting medium for a plurality of traction devices generally designated by the numeral 24. As particularly illustrated in Figs. 1 and 4, the traction devices extend in spaced relation diagonally of the tire so that as the wheel rotates the traction devices will be gradually engaged with the ground. That is to say, the several traction devices arranged about the tire are not squarely presented to the ground but are gradually brought into contact with the ground so that continuous and unbroken traction will be had between the ground and the wheels. In this manner no objectionable shocks are transmitted from the traction wheels to the power plant of the vehicle as the result of sudden engagement of the traction devices with the ground Each traction device 24 comprises a cable 25 composed of a plurality of twisted strands of wire. As illustrated particularly in Fig.

1, the cable 25 is folded upon itself intermediate its ends so as to form a pair of cable sections upon which are strung a plurality of elongated blocks 26 adapted for engagement with the ground. The elongated blocks 26 may be formed of any suitable wear-resisting material and are provided with openings near their ends which receive the sections of the cable. The intermediate portion of the cable in being bent upon itself defines a loop 28 connected to the apertured head of an eye bolt 29. As particularly illustrated in Fig. 3, the eye bolt 29 of each traction device 24 is extended through the transverse opening 30 in the attaching ring 18 and is held in position by a nut 31. It will be noted that the nut 31 may be adjusted on the shank of the eye bolt 29 for adjustably securing the traction device about the tire. The end portions of the cables 25 are extended through transverse openings 32 in the attaching ring 18 and are engaged by cable clamps 33. Each cable clamp 33 comprises a grooved body 34 having a U-bolt 35 connected thereto and arranged on opposite sides of the end portions of the cable. Upon being tightened by nuts 36 the U-bolt 35 is drawn into locking engagement with the adjacent portions of the cable so that the same is securely held in position. It will be noted that the cable clamp serves the dual function of securing one end of the traction device 24 to the attaching ring 18 and of connecting the ends of the cable 25.

The end blocks of each row of tread blocks includes a pair of sections 37 detachably connected by a screw bolt 38 or other suitable fastening means. By this construction, the end blocks may be locked in a desired position on the cable for securing the inner blocks in a set position. When it is desired to remove any of the inner blocks, one of the end blocks may be detached for allowing the end blocks to be slid off the free ends of the cable. The cable clamp must, however, be detached prior to removing any of the blocks from the sections of the cable. By this construction any of the blocks may be replaced upon becoming worn.

The sections of the cable 25 are prevented from scratching or otherwise marring the felly and spokes of the wheel by rubber tubes 40 which may be applied to the cable.

In applying the improved non-skid device, the attaching ring 18 is, of course, secured to one side of the wheel by the bolts 19 and the associated plates 20. With the attaching plate 18 thus secured to one side of the wheel adjacent the felly of the same, the eye bolts 29 of the traction devices may be connected with the ring after which the cable sections may be moved about the outer side of the tire for positioning the tread blocks 26 about the tire. In connecting the free ends of the cable to the ring, the tread blocks are of course extended diagonally of the tire so that as the wheel rotates the several tread devices will be gradually engaged with the ground. When it is desired to detach any of the blocks, it is merely necessary to remove the proper cable clamp 33 and the end block 37 to allow the blocks 26 to be moved off the cable sections.

With reference to the foregoing description taken in connection with the accompanying drawings, it will be observed that the tread blocks do not injure the tire since they are flatly engaged with the tread of the tire. In practice as many of the traction devices as necessary may be employed.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. A non-skid attachment for vehicle wheels comprising a flexible element bent intermediate its ends to form a pair of sections and a loop, an annular attaching element, a fastening device extending from said loop and engaged with said annular attaching element, and means to connect the free ends of said flexible element and to secure the same to said annular attaching element.

2. A traction device for vehicle wheels comprising a flexible element folded upon itself intermediate its ends to form a pair of sections, a plurality of tread blocks having openings slidably receiving said sections, the end blocks of said row of blocks being provided with means whereby the same may be rigidly connected to said sections, and attaching means for the ends of said flexible element.

3. A non-skid attachment for vehicle wheels comprising a cable doubled upon itself to form a pair of sections and a loop, tread devices carried by said sections, an attaching member, a cable clamp connecting the ends of said cable and securing the same to said attaching member, and means whereby said loop may be connected to said attaching member.

In testimony whereof I affix my signature.

JOHN BERNARD NESMEYER. [L. S.]